United States Patent
Watanabe et al.

(10) Patent No.: US 7,663,994 B2
(45) Date of Patent: Feb. 16, 2010

(54) DATA RECORDING METHOD AND DATA RECORDING EQUIPMENT

(75) Inventors: Koichi Watanabe, Hachioji (JP); Takahiro Kurokawa, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 766 days.

(21) Appl. No.: 11/340,563

(22) Filed: Jan. 27, 2006

(65) Prior Publication Data
US 2007/0070855 A1    Mar. 29, 2007

(30) Foreign Application Priority Data
Sep. 29, 2005    (JP) ............... 2005-284396

(51) Int. Cl.
*G11B 7/00*    (2006.01)
(52) U.S. Cl. .................. 369/47.5; 369/59.11
(58) Field of Classification Search ........ 369/116, 369/47.5, 47.51, 47.52, 47.53, 59.11, 59.12, 369/59.1
See application file for complete search history.

(56) References Cited

U.S. PATENT DOCUMENTS

| | | | |
|---|---|---|---|
| 5,197,059 A * | 3/1993 | Minami et al. | 369/116 |
| 7,298,681 B2 * | 11/2007 | Asada et al. | 369/47.51 |
| 7,471,605 B2 * | 12/2008 | Fujita et al. | 369/59.11 |
| 2003/0063540 A1 | 4/2003 | Kato et al. | |
| 2003/0067857 A1 | 4/2003 | Shirota et al. | |

FOREIGN PATENT DOCUMENTS

| | | |
|---|---|---|
| JP | 2002-298349 | 10/2002 |
| JP | 2003-85753 | 3/2003 |
| JP | 2005-032340 | 2/2005 |
| JP | 2005-209309 | 8/2005 |

* cited by examiner

*Primary Examiner*—Nabil Z Hindi
(74) *Attorney, Agent, or Firm*—Antonelli, Terry, Stout & Kraus, LLP.

(57) ABSTRACT

A frequency characteristics compensation method that can be applied to various waveforms (strategies). When determining the amount of frequency compensation, a deteriorated part by frequency characteristics is compensated for with respect to the difference between the pulse power to be compensated and the power level immediately before it. The present invention can also be applied to variations in the performance, aged deterioration, and temperature characteristics.

12 Claims, 10 Drawing Sheets

Setup value of laser driver power register

| Power register | Setup register | Compensation by this patent |
|---|---|---|
| Pfw (for FP) | A | A+Hf |
| Pmw (for MP) | A | A+Hm |

Relation of Frequency (F) and pulse width (W)

$F \propto 1/WC$

FIG. 7

| | | table | | |
|---|---|---|---|---|
| | | (1) | (2) | (3) |
| Pulse width | 1.5ns | C | D | E |
| | 2ns | B | C | D |
| | 2.5ns | A | B | C |

FIG. 8

Mark edge

FIG. 9

A deteriorated part by frequency

DATA RECORDING METHOD AND DATA RECORDING EQUIPMENT

CLAIM OF PRIORITY

The present application claims priority from Japanese application JP 2005-284396 filed on Sep. 29, 2005, the content of which is hereby incorporated by reference into this application.

FIELD OF THE INVENTION

The present invention relates to an optical recording equipment and method wherein optically-modulated waveforms are driven and controlled when writing data to a data recording medium, including CD-R drives, CD-RW drives, DVD-R drives, DVD-RW drives, DVD-RAM drives, Blu-ray disk drives, HD-DVD drives, and the like.

The optical disk recording equipment in general has realized large storage capacities, and Blu-ray Disks (BD) and High Density (HD)-DVDs using blue laser of 405 ns wavelength have begun to be marketed, in addition to conventional CDs using 780 nm infrared laser and DVDs using 650 nm infrared laser. For example, the write strategy technology used for BDs utilizes a plurality of laser pulses having three types of power levels: write power (Pw), erase power (Pe), and bottom power (Pb) in descending order. If an optical disk is irradiated with a laser beam of the write power, the recording film of the optical disk is melted. If this disk is rapidly cooled thereafter, the disk becomes amorphous (noncrystalline) and reflection ratio of the light drops. This is used as a recording mark. Also, if irradiated with a laser beam of the erase power, the recording film of the optical disk becomes crystalline. That is, a portion of the optical disk that was amorphous before irradiation of a laser beam becomes crystalline, while a portion that was crystalline remains crystalline even after irradiation. This allows a recording mark to be erased.

The write strategy includes the rectangular monopulse employed for CD-Rs, DVD-Rs, and the like, the comb-like multipulse (refer to FIG. 11) employed for CD-RWs, DVD-RWs, DVD-RAMs, and the like, and the castle-type (non-multi type) recording pulse (refer to FIG. 8) employed for high-speed recording of DVD-based optical disks.

The write strategy comprises a value for determining the edge timing of a write waveform and a value for determining the write power (such as Pw, Pb, or Pe), which are called write parameters. The optimum values of these write parameters are prerecorded in each recording medium, for example, in the disk information in the case of BDs. This is because the optimum values of a group of write parameters differ with the composition, material, and the like of a recoding medium. That is, when recording a recording mark, write parameters such as a value for determining the edge timing of a write waveform, a value for determining the write power such as Pw and Pm, and values in a shift table are read from the recording medium, and laser pulses are controlled using these write parameters thus read out, to form an optimal recording mark.

Patent document 1: JP-A No. 85753/2003

SUMMARY OF THE INVENTION

Figure 5:
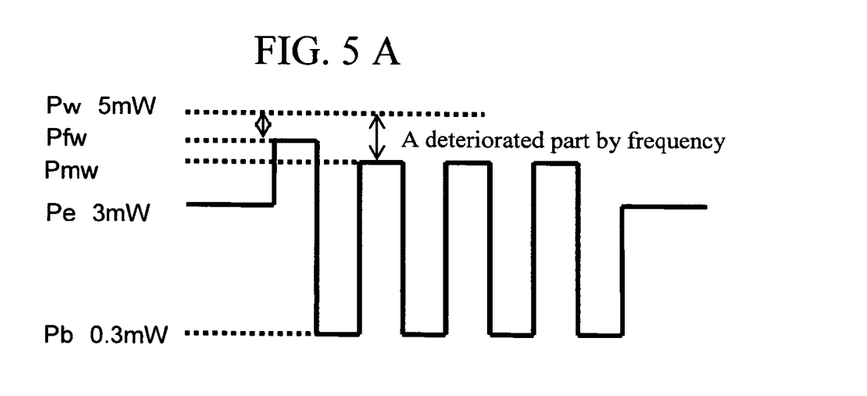
FIG. 5A and FIG. 5B explain frequency deterioration due to a laser driver of the multipulse write strategy.
Figure 14:
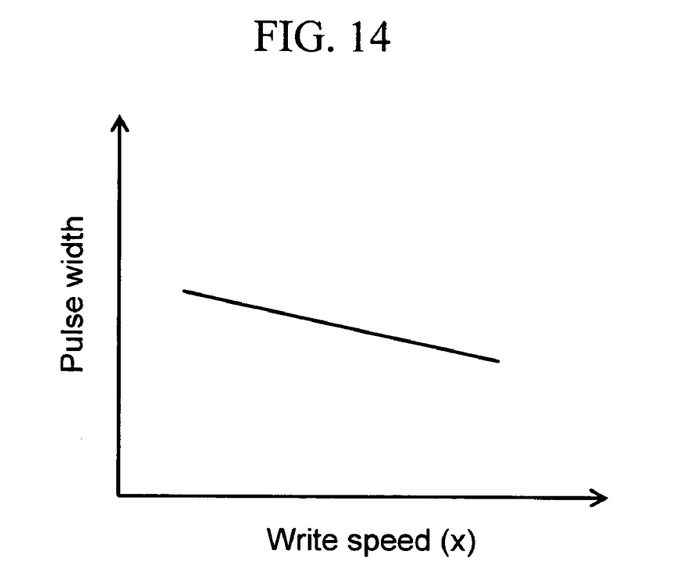
FIG. 14 shows a relationship between write speed and required pulse width.
Figure 15:
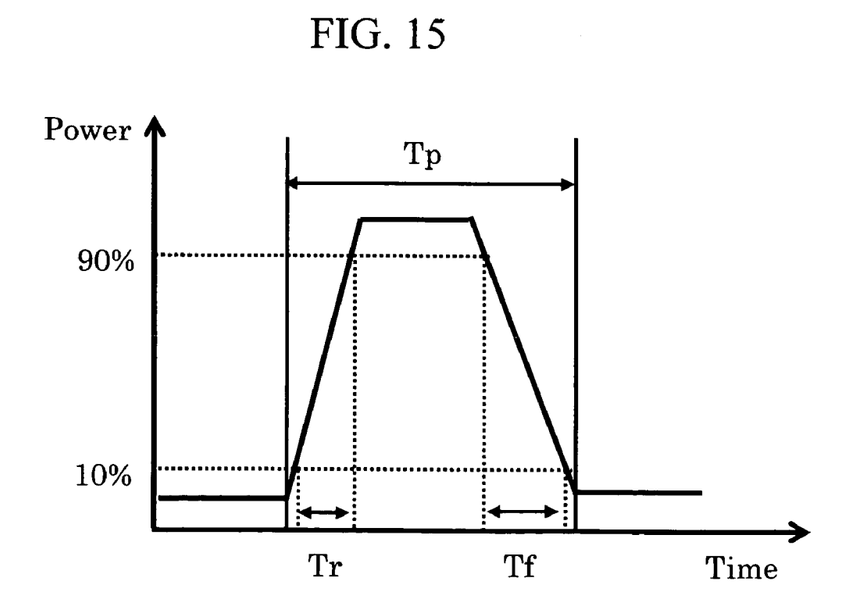
FIG. 15 is an explanatory diagram of the tf/tf of a laser driver and pulse width.

If recording speed of optical disks becomes faster in the future, they will deal with pulses of the order of several hundred MHz to several GHz. As shown in FIG. 14, as the recording speed becomes faster, narrower pulses are required. For quad-speed BDs, one window width Tw is approximately 3.8 ns, and about 0.5 Tw is often required as the pulse width used for the strategy. Generally, given the bandwidth of laser drivers used in optical disks, and given that the 10 to 90% rise/fall rate, tr/tf, is currently about 1.5 ns, the above pulse width is already in a range where light-emitting power is not generated as instructed. This means that, if the 10 to 90% rise/fall rate is 1.5 ns, simply stated, 0 to 100% rise/fall rate takes 1.25 times longer than the 10 to 90% rise/fall rate, i.e., about 1.9 ns, as shown in FIG. 15. Given that pulse width becomes 1.9 ns for 0.5 Tw of the BD4x, if the 0 to 100% rise takes 1 ns or longer, a pulse cannot rise fully. Then, the power is not generated by a deteriorated part by frequency, as shown in the wavelength of FIG. 5A, and consequently a distortion occurs, resulting in a failure to record a desired recording mark. Measures such as increasing the command value of the laser driver is conceivable for compensating for this, but how to determine the amount of the compensation may depend on variations in laser driver, strategy, temperature characteristics, aged deterioration, and the like.

In view of the above problems, it is an object of the present invention to provide an optical recording equipment and method capable of performing the compensation for frequency characteristics of a laser driver (the frequency characteristic herein means the frequency characteristic of amplitude attenuation) precisely for any waveform (strategy).

Figure 4:
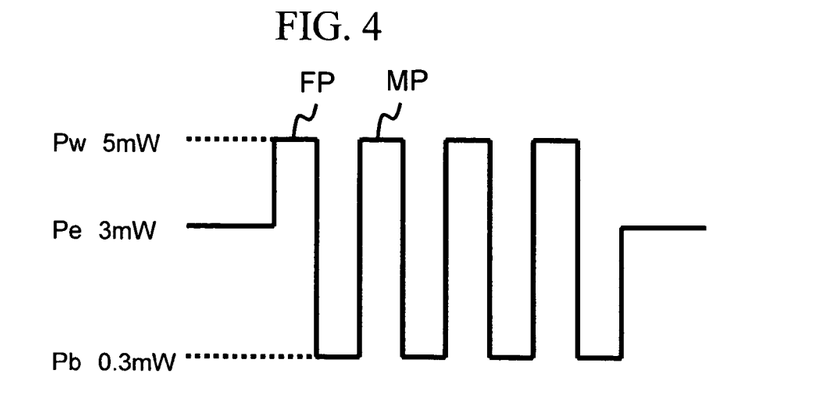
FIG. 4 shows an example of a desired waveform of the multipulse write strategy.

For example, if the write waveform of BD-RE 1× shown in FIG. 4 is written by a laser driver that does not compensate for deteriorations of frequency characteristic, the power level of the pulse waveform drops by a deteriorated part by frequency as shown in FIG. 5A. This necessitates the compensation for the dropped power by means of register setting in the laser driver. However, if the compensation for waveform distortion is performed uniformly for all pulses, the Pfw that rises to Pw after Pe becomes larger than Pmw as shown in FIG. 5B.

Accordingly, in the present invention, the compensation is performed taking into consideration the power level immediately before a pulse to be compensated for. That is, for FP, a register setting for adding the following to the initial register value is performed:

$(Pw-Pe) \times \alpha$(frequency deterioration correction coefficient)$=Hf$ and, for MP, a register setting for adding the following to the initial register value is performed:

$(Pw-Pb) \times \alpha$(frequency deterioration correction coefficient)$=Hm$

That is, by compensating for the difference between the power level of a pulse to be compensated for and the power level immediately before it, optimum power compensation is achieved. This compensation method can be applied to strategies that use levels of three or more values.

In other words, the data recording method according to the present invention comprises the steps of: encoding recording data; generating a write waveform that forms a write strategy based on the encoded signal; correcting the power of each pulse signal constituting a write waveform, according to the difference in power level between each pulse signal and the power level immediately before it; driving a laser beam source so as to obtain the corrected power; and irradiating a laser beam emitted from the laser beam source to a recording medium.

Also, the present invention is particularly effective for high-speed recording wherein the rise or fall of a waveform is a concern, and is particularly preferable for optical disk storage systems with 100 Mbits or more transfer rate. The high-speed recording wherein the rise or fall of a waveform is a concern is a case where, when the write waveform is a multipulse comprising a head pulse, repeating pulses, and a tail pulse, if duration of the head pulse is Tfp, duration of the repeating pulse is Tmp, rise time (10 to 90%) of a laser pulse of an data recording equipment is Tr, fall time (10-90%) of a laser pulse is Tf, at least one of the following is satisfied:

$$Tfp \leq 1.25 \times (Tr+Tf)$$

$$Tmp \leq 1.25 \times (Tr+Tf)$$

Another case is where, if a write waveform has a head pulse and a tail pulse, and duration of the head pulse is Tfp, duration of the tail pulse id Tep, rise time of the laser pulse of an data recording equipment is Tr, and fall time of the laser pulse is Tf, at least one of the following is satisfied:

$$Tfp \leq 1.25 \times (Tr+Tf)$$

$$Tep \leq 1.25 \times (Tr+Tf)$$

According to the present invention, it is possible to compensate for a deteriorated part by frequency characteristics due to performance variations, aged deterioration and/or temperature characteristics of the laser driver of an optical disk drive.

DETAILED DESCRIPTION OF THE PREFERRED EMBODIMENTS

Preferred embodiments of the present invention are described below with reference to the drawings.

Embodiment 1

This is an embodiment in which the present invention is applied to the multipulse strategy-related power compensation (i.e., compensation for variations in frequency characteristic of a drive).

Figure 1A:
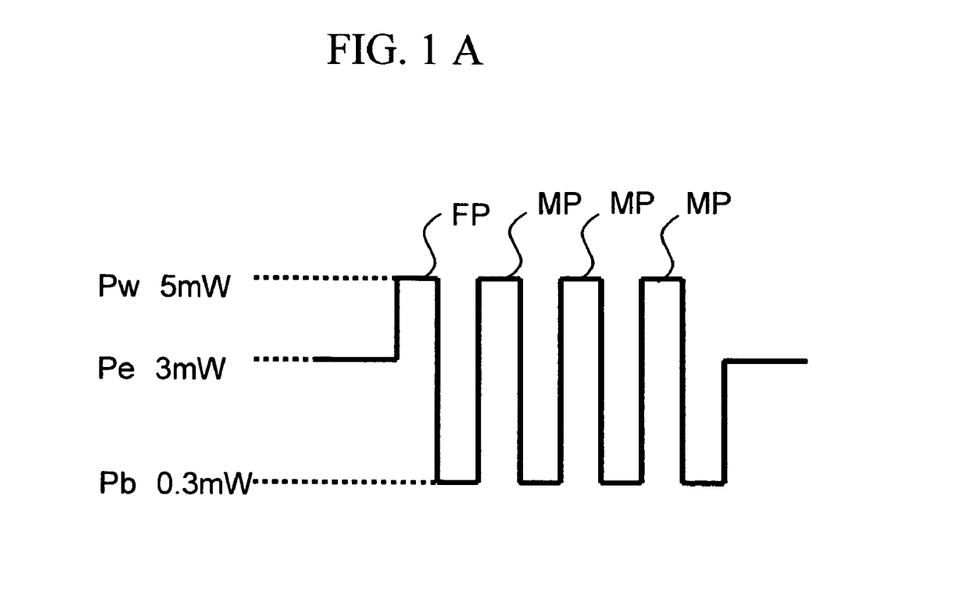
FIG. 1A and FIG. 1B show an example pulse train of the multipulse strategy and the compensation of register values by the present invention.
Figure 1B:
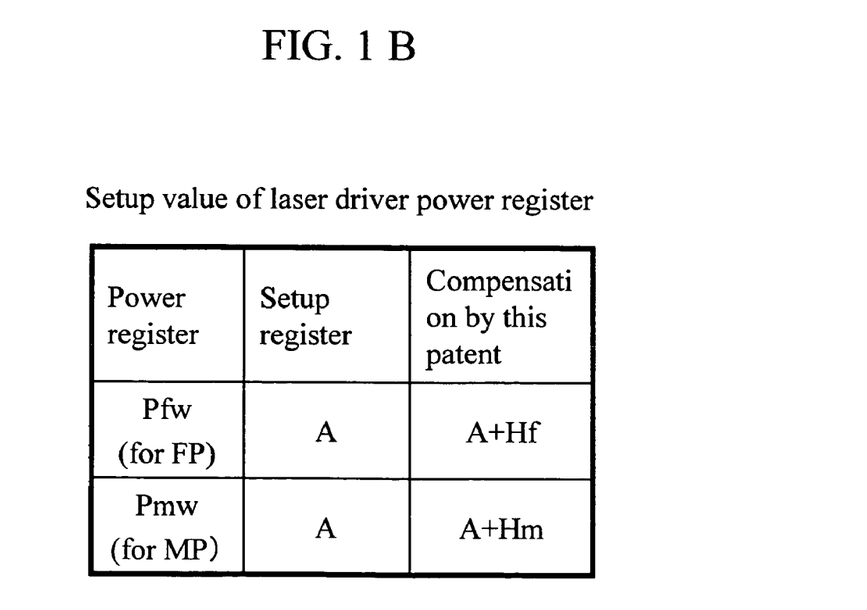

FIGS. 1A and 1B show an example pulse train of the multipulse strategy and a method of compensation for register values according to the present invention, respectively. As shown in FIG. 1A, a pulse train of the multipulse strategy is composed of a front pulse (FP) and following multiple pulses (MP), and has three types of power levels: write power (Pw), erase power (Pe), and bottom power (Pb).

FIG. 1B shows initial setup values of laser driver registers and the compensation method of the present invention. This figure shows that, when the initial setup value of a power register for FP is A and that of a power register for MP is A, the setup of the power register for FP is changed to (A+Hf) to compensate for the frequency characteristics of FP, and that of the power register for MP is changed to (A+Hm) to compensate for the frequency characteristic of MP. That is, in this embodiment, the compensation value is changed according to the type of pulse, namely FP or MP.

Figure 2:
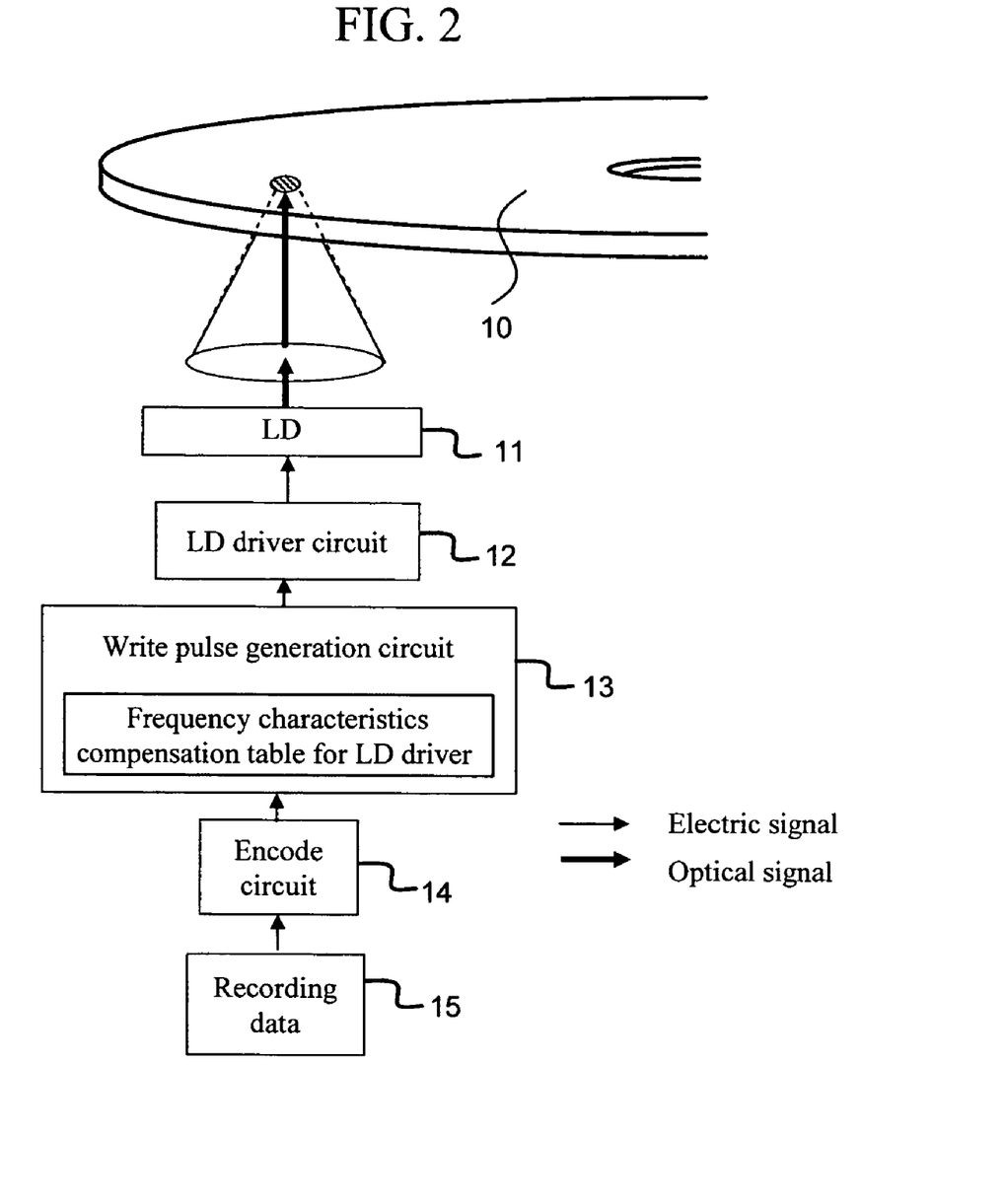
FIG. 2 is a schematic diagram showing a process in which a write signal is written to an optical disk.
Figure 3:
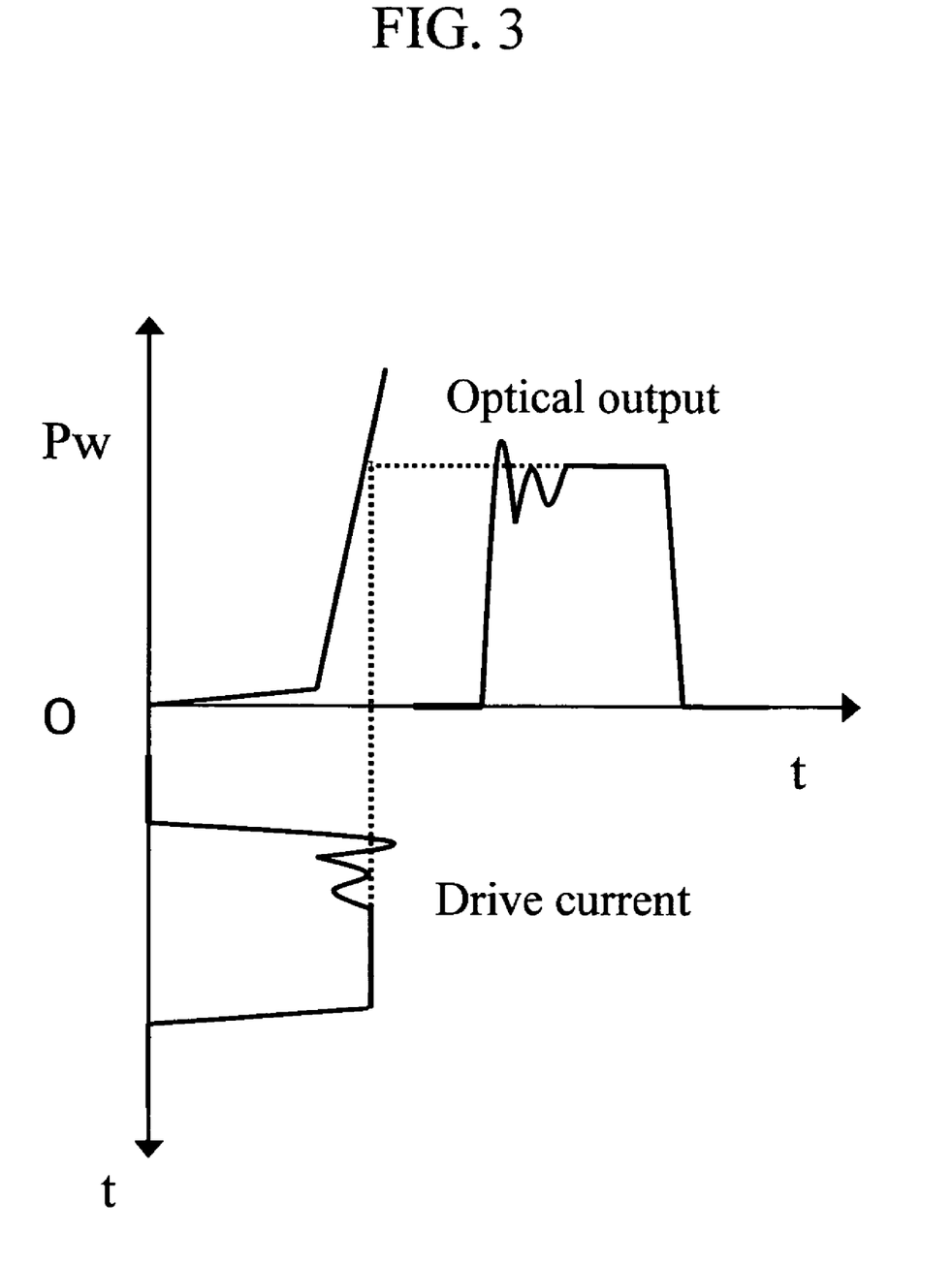
FIG. 3 is a diagram showing a relationship between a drive current and an optical output.

FIG. 2 shows the process in which a recoding signal is written to an optical disk. A laser driver 12, upon receipt of a register command, outputs a current corresponding to the register value. Write data 15 is encoded in an encode circuit, and the encoded signal is converted to a signal, in a write pulse generation circuit 13, that forms a strategy to write the signal to an optical disk 10. A power register is contained in the write pulse generation circuit 13. The write pulse generation circuit 13 holds a frequency characteristics compensation table for LD driver. The signal generated by the write pulse generation circuit 13 is then input to a LD driver circuit 12. As shown in FIG. 3, a current waveform from the LD driver circuit becomes a laser emission waveform without being changed in a laser diode.

When writing the data, it is necessary to optimize the write parameters between a recording medium and a recording equipment, for example, to optimize the write parameters so that the number of jitters or errors in the readout signal, an indicator of recording quality, when the data is written to the medium and reproduced based on the write parameters provided by the medium manufacturer written in the recording medium (this operation is hereinafter referred to as "write parameters leaning"). Since frequency characteristics deterioration cannot be compensated for by this recording parameter learning, if a write waveform of a BD-RE 1× as shown in FIG. 4 is written by a driver that does not compensate for frequency characteristics deterioration, the resulting write waveform becomes a write waveform with its power level reduced by a deteriorated part by frequency, as shown in FIG. 5A. Therefore, it is necessary to compensate for reduced power by setting the register in the driver to produce a waveform as shown in FIG. 4, and write that waveform to the recording medium 10.

Figure 6:
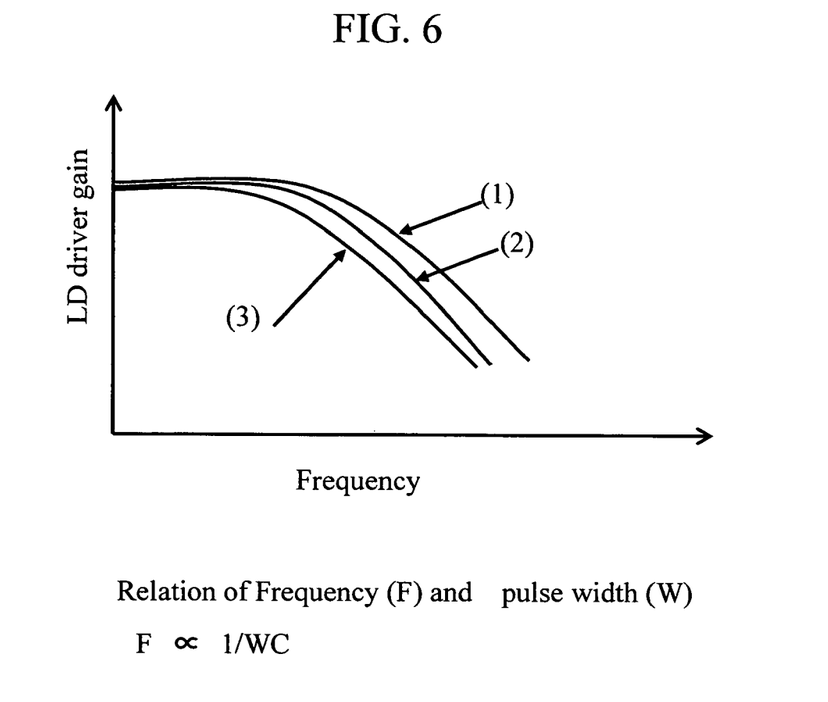
FIG. 6 is a diagram explaining variations in the frequency characteristic of a laser driver.

The frequency characteristics (i.e., dependence of amplitude attenuation on frequency) of the laser driver vary with operating temperatures and aged deterioration as shown in FIG. 6, and hence it is expected that it has a plurality of frequency characteristics depending on the conditions. Also conceivable is the dependence of an emission waveform on frequency, i.e., the emission waveform also depends on variations in the driver circuit itself or variations in the driving laser diode. These plurality of frequency characteristics is stored in a storage means in the recording equipment, namely the frequency characteristics compensation table for LD driver contained in the write pulse generation circuit 13. The plurality of frequency characteristics to be stored correspond to the respective curves in FIG. 6.

Figure 7:
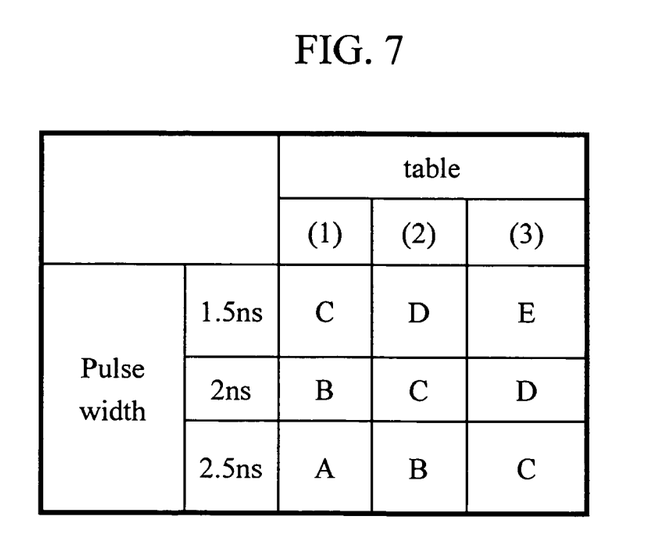
FIG. 7 shows an example register table for pulse width.

The curves representing respective frequency characteristics are named (1), (2), and (3) as shown in FIG. 6, and the compensation coefficients for the deteriorated part by frequency are tabulated based on the relationship between the pulse width and frequency characteristic of a waveform, or parameters taking into the deteriorated part by frequency are tabulated, and then the power register in the laser driver is set so as to make the values optimal for power compensation. FIG. 7 is an example of a table listing the compensation coefficient for the deteriorated part by frequency relative to pulse width. Tables (1), (2), and (3) correspond to frequency characteristics (1), (2), and (3) in FIG. 6. The write pulse generation circuit 13, based on the write parameters read from a recording medium, determines a power value to generate a write pulse by referring to the tables shown in FIG. 7, and sets that value in the power register. At this time, if a uniform compensation is performed using these tables for all the pulses without considering the last power level, the Pfw that rises to Pw after Pe becomes larger than the Pmw that rises to Pw after Pg, as shown in FIG. 5B. Accordingly, in the present invention, the compensation for each pulse is performed taking into consideration the pulse height from the last power level.

For example, if the pulse width of FP is 2 ns, and the deteriorated part by frequency correction coefficient table (1) for laser driver register in FIG. 7 is applied, the frequency correction amount Hf becomes as shown in expression (1) below, with reference to FIG. 7.

$$(Pw-Pe) \times B(\text{frequency deterioration correction coefficient}) = Hf \quad (1)$$

Therefore, for FP, a register setup for adding frequency correction amount Hf to the initial register setup value A is performed, as shown in FIG. 1. That is, the value of the power register for FP becomes A+(Pw−Pe)×B when frequency characteristic is compensated for according to the present invention.

Likewise, the frequency correction amount for MP with pulse width of 2 ns under the same condition (1) becomes as shown in expression (2), with reference to FIG. 7.

$$(Pw-Pb) \times B(\text{frequency deterioration correction coefficient}) = Hm \quad (2)$$

Therefore, for MP, a register setup for adding frequency correction amount Hm to the initial register setup value A is performed, as shown in FIG. 1. That is, the value of the power register for MP becomes A+(Pw−Pb)×B when frequency characteristic is compensated for according to the present invention.

That is, by determining compensation amount for the difference between the power level of a pulse for compensation and that of the last power level, optimum power compensation is achieved. This compensation method allows highly accurate compensation if applied to a strategy that uses a power level of three or more values.

Because of this, it is possible to reproduce respective waveforms faithfully, even when the write parameters are provided, written in the recording medium, by the medium manufacturer. The write parameters mean herein parameters to form a write waveform, such as multipulse or monopulse, and the sift width and pulse height of head and tail pulses.

Typically, a laser driver formed by semiconductor circuits varies in characteristics with temperatures. This temperature characteristic causes the aforementioned tr/tf to vary. In particular, for a laser driver enabling fast recording wherein tr/tf is not considerably different from the pulse width, variations in tr/tf affect the frequency characteristics. Also, as recording speed becomes faster, the power consumption of the driver circuit tends to increase, and thereby the temperature variation is also increased. This variations in frequency characteristics with temperature variations are measured beforehand, and tables for varied temperatures are also provided beforehand (for example, table (1) in FIG. 7 is selected for 25° C.). Thus, by providing a temperature sensor in the drive, measuring the temperature in the drive even in operation, changing a table to be selected according to temperature variation, and changing the setup value in the register of the laser driver, it is possible to stabilize the drive operation regardless of temperature variations.

Embodiment 2

Now, an embodiment in which the present invention is applied to power compensation associated with a castle-like strategy (variations in the frequency characteristics of a drive) is described. The description of what is basically the same with embodiment 1 is omitted.

Figure 8:
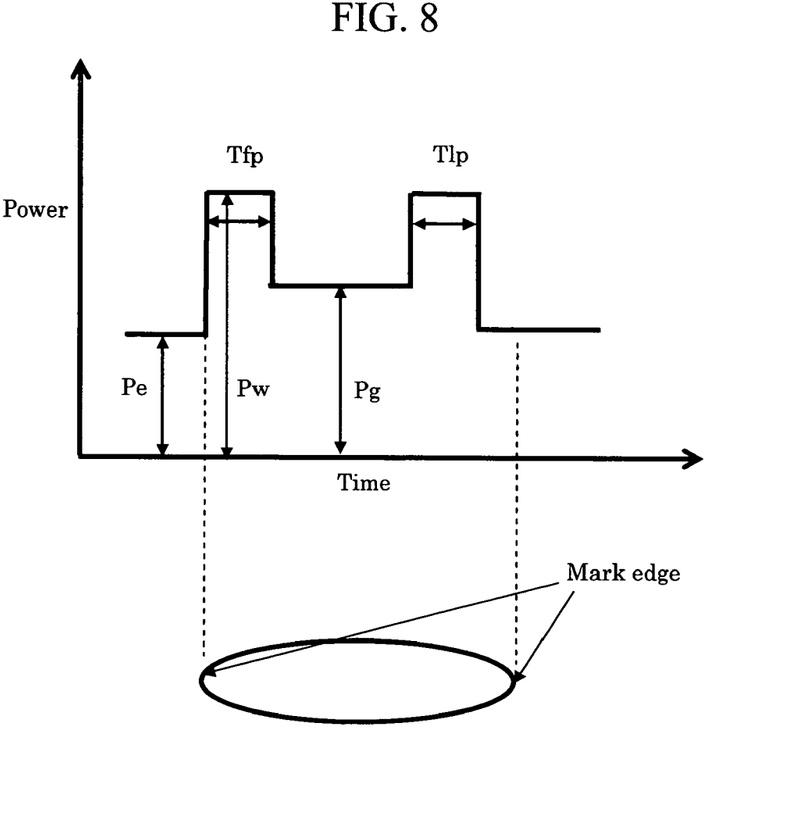
FIG. 8 shows an example of a desired waveform of the castle-like strategy.

FIG. 8 is a diagram showing an example pulse train of the castle-like strategy. As shown in the figure, a pulse train of the castle-like strategy comprises a first pulse (FP), a last pulse (LP), and a gap pulse (GP), and has three types of power levels: write power (Pw), erase power (Pe), and gap power (Pg).

Figure 9:
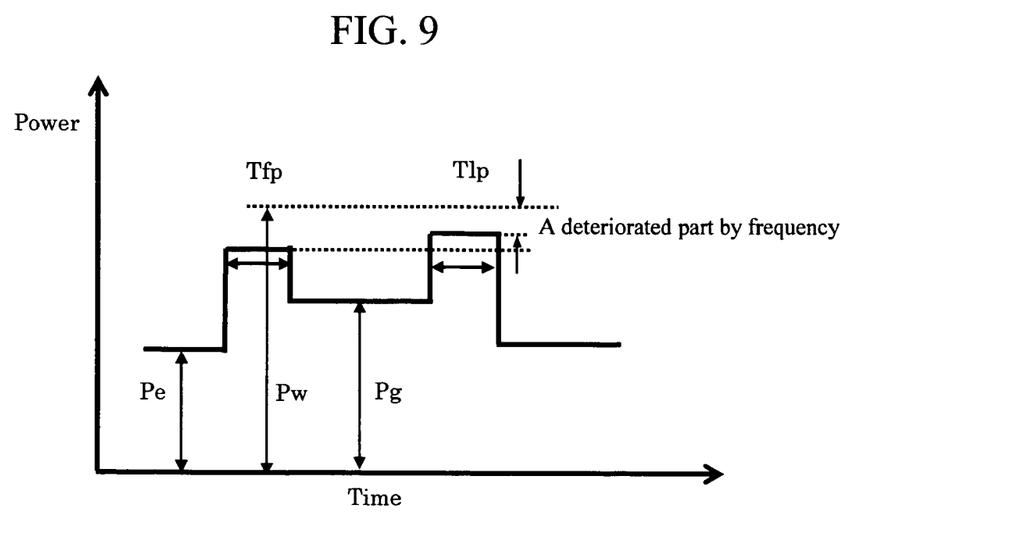
FIG. 9 is an explanatory diagram of frequency deterioration due to a laser drive of the castle-like strategy.

In the case of the castle-like strategy, since the power level immediately before an FP is smaller than the power level immediately before an LP, the amount of power level reduction due to deterioration of frequency characteristics becomes larger in FP than in LP, as shown in FIG. 9. Therefore, the amount of frequency characteristic correction by the power level register should be made larger for FP than for LP.

According to the present invention, the amount of correction for FP becomes (Pw−Pe) multiplied by a correction coefficient, and that for LP becomes (Pw−Pg) multiplied by a correction coefficient, and therefore the above requirement can be satisfied. As a result, an ideal pulse train of castle-like strategy as shown in FIG. 8 can be generated.

Thus, by applying the present invention also to various write waveforms (strategies), it is possible to correct easily and precisely the power drops due to frequency deterioration, and to thereby secure margins for various changes in the drive.

Embodiment 3

A pulse compensation method using the FWHM (full width at half maximum) additionally is now described.

Figure 10:
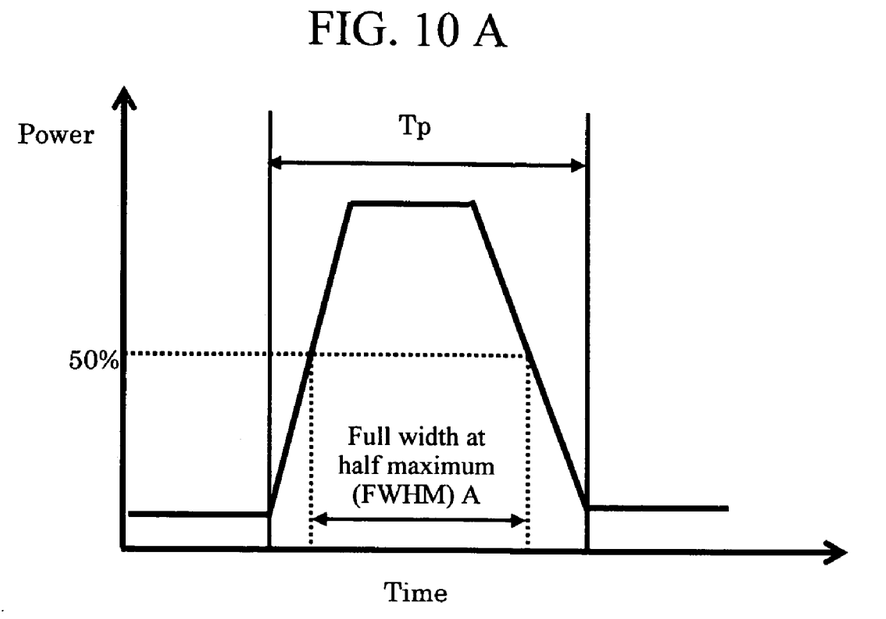
FIG. 10A and FIG. 10B are explanatory diagrams of a compensation taking FWHM (full width at half maximum) into consideration.

As shown in FIGS. 10A and 10B, two drives with different tr/tf may have different FWHM even when the setting is the same. In this case, the aforementioned pulse power compensation method alone cannot compensate completely, and sufficient recoding performance may not be obtained. This makes it necessary to take additionally the FWHM into consideration and correct the FWHM to a specified pulse width.

Figure 11:
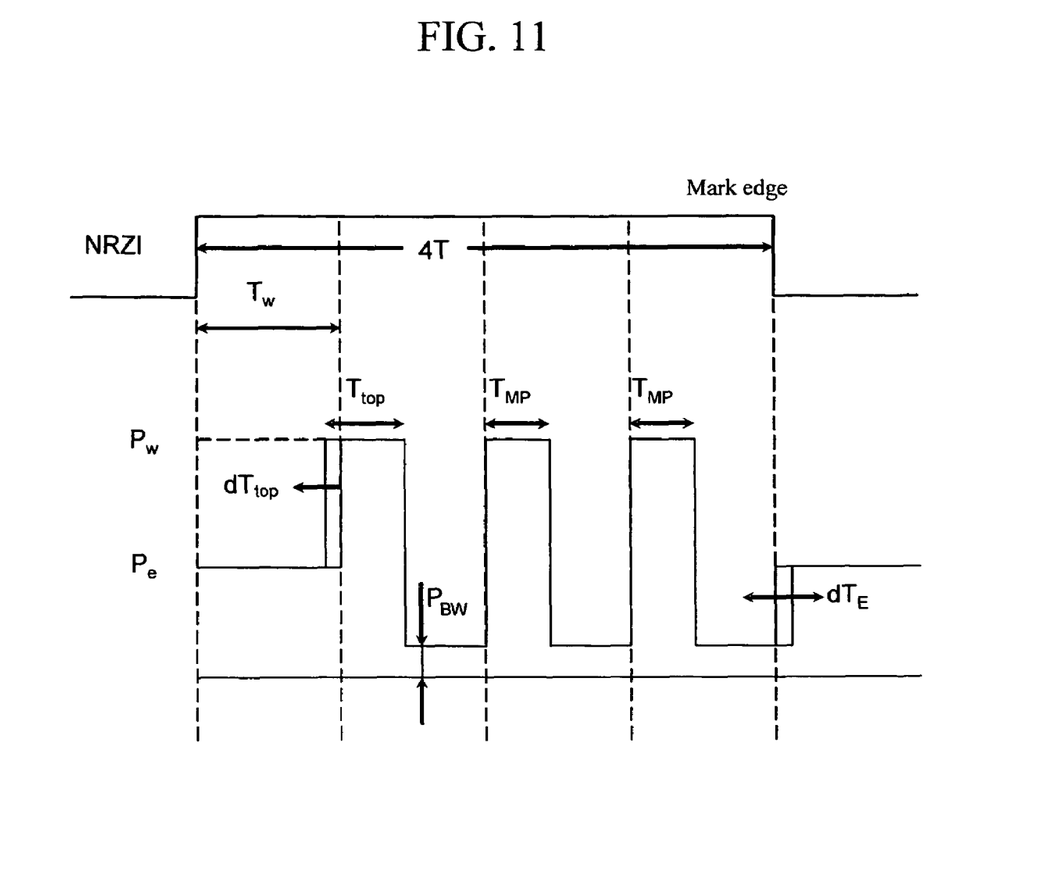
FIG. 11 is a diagram showing the definition of the BD multipulse write strategy.

That is, since total energy to be applied to a recording film is determined by:

$$FWHM(\text{unit:time}) \times \text{pulse power} = \text{pulse area},$$

a highly accurate compensation method is established to maintain recording performance by correcting a deteriorated part by frequency to a desired waveform, using this pulse area as an indicator. Specifically, by changing the value of a timer of the driver circuit that determines the rise and fall positions of each pulse, it is possible to shift the dTop and dTE as shown in FIG. 11. The FWHM of each pulse is set to a desired value by setting the timer value. Then, the pulse power compensation of the embodiments 1 and 2 is performed to a desired pulse area, and the data is written.

Embodiment 4

Figure 12:
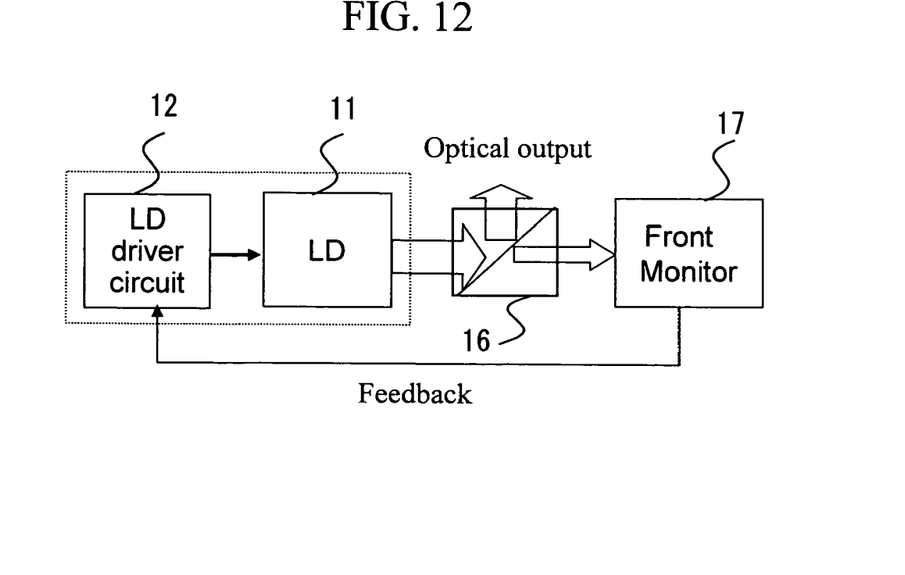
FIG. 12 is an explanatory diagram of APC.

An embodiment in which the present invention is applied to APC (Auto Power Control) is described with reference to FIGS. 11 and 12. First, the APC is briefly explained. APC is roughly divided into two: read APC that is performed during the read of an optical disk and write APC performed during the write. The read APC is performed to maintain a read power at, for example, 0.35 mW with overlapped high frequency (400 MHz for BD) being applied. In contrast to this, there is a technique called W-APC (Write-Auto Power Control) to optimize a write power. This is a technique to correct the write power by observing the write waveform on a front monitor, in order to keep the write power constant during the write with an optical disk-specific waveform called a strategy. These APCs are implemented by monitoring, on a front monitor 17, the split optical powers outputted from a beam splitter 16, and feeding them back to the laser driver, as shown in FIG. 12.

The read APC is a technique for monitoring a constant power and has no problem, but for the write APC, the strategy must be considered when monitoring a power, and in many cases where a write waveform is observed on the front monitor, the bandwidth of the front monitor is lower than the frequency determined by the pulse width of the write waveform and thus the intensity of an actual write pulse cannot be observed. Accordingly, a power of low frequency is often observed that corresponds to Pe in the strategy of FIG. 11 and can be sufficiently observed on the front monitor. Since Pe is corrected by W-APC in the strategy shown in FIG. 11, if the present invention is applied, the register Pwf of the first pulse is also changed with changes in the Pe register. This enables correction not only during the register setting before writing but also during the writing, thus leading to improved precision.

Embodiment 5

Figure 13:
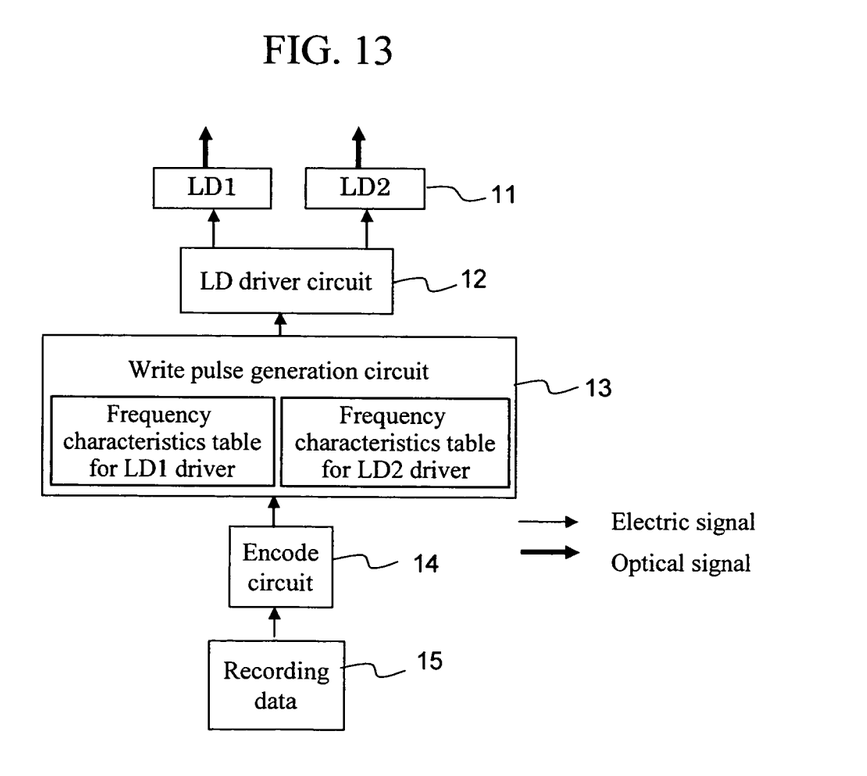
FIG. 13 is a diagram showing an example of driving two or more LDs.

An embodiment in which the present invention is applied to a drive containing two or more LDs is described with reference to FIG. 13. For simplicity, FIG. 1 shows an example where two LDs, LD1 and LD2, are used.

If an attempt is made to drive two or more LDs with one laser driver circuit, the distance between LDs and the driver increases due to restraints on arrangement of optical components or the like, and frequency characteristics may be remarkably deteriorated. Here again, the frequency characteristics for increased distance is determined beforehand, and the correction coefficients for correcting a deteriorated part by frequency are tabulated, as described above. At this time, as shown in FIG. 13, tabulating for each of LD1 and LD2 allows compensation for frequency characteristics deterioration due to increased wiring length between LD and driver as well as the aforementioned aged deterioration and temperature variations, and stable fast operation is achieved.

What is claimed is:

1. A data recording method comprising the steps of:
    encoding recording data;
    generating a write waveform that forms a write strategy based on said encoded signal;
    setting a value corresponding to the power of each pulse signal constituting said write waveform in a power register;
    driving a laser driver according to the setting in said power register, and
    irradiating a laser beam emitted from a laser beam source connected to said laser driver, to a recording medium,
    wherein said step of setting a value corresponding to the power of each pulse signal in the power register sets, in said power register, a value after being corrected to compensate for a deteriorated part by frequency characteristic for the difference between the power of each pulse signal and the power level immediately before that pulse.

2. A data recording method according to claim 1, wherein said correction is performed by adding, to an initial setup value, a value obtained by multiplying the difference between the power of said pulse signal and the power level immediately before said pulse signal by a correction coefficient.

3. A data recording method according to claim 2, wherein said correction coefficient depends on pulse width.

4. A data recording method according to claim 2, wherein said correction coefficient depends on the temperature in a drive.

5. A data recording method according to claim 1, wherein correction of a pulse power register or pulse width is performed using the FWHM (full width at half maximum) of a pulse and taking into consideration the energy to be applied to a recording film.

6. A data recording method according to claim 1, further comprising a step of reading the write waveform parameters written in said recording medium beforehand, wherein a write waveform forming a write strategy is generated based on said read write waveform parameters.

7. A data recording equipment comprising:
    an encoding circuit for encoding recording data;
    a power register;
    a write pulse generation circuit that generates a write waveform forming a write strategy based on an output signal from said encoding circuit, and sets in said power register a value corresponding to the power of each pulse constituting said write waveform;
    a driver circuit that is driven according to the setting in said power register;
    a table that stores a deteriorated part by frequency characteristics correction coefficient for said driver circuit; and
    a laser beam source that is driven by said driver circuit,
    wherein said write pulse generation circuit sets in said power register a value obtained by adding, to an initial setup value, a value obtained by multiplying the difference between the power of a pulse signal and the power level immediately before it by said deteriorated part by frequency characteristics correction coefficient.

8. A data recording equipment according to claim 7, wherein said table stores said deteriorated part by frequency characteristics correction coefficient for a plurality of pulse widths under a plurality of conditions.

9. A data recording equipment according to claim 8, wherein said plurality of conditions include a plurality of temperatures.

10. A data recording equipment according to claim 7, wherein a plurality of said laser beam sources are provided and said table is provided for each of said plurality of laser beam source.

11. A data recording equipment according to claim 7, wherein:

said write waveform is a multipulse consisting of a head pulse, repeating pulses, and a tail pulse; and if the duration of said head pulse is Tfp, that of said repeating pulse is Tmp, the rise time (10 to 90%) of a laser pulse of said data recording equipment is Tr, and the fall time (10 to 90%) of the same is Tf, at least one of the following is satisfied:

$Tfp \leq 1.25 \times (Tr+Tf);$ $Tmp \leq 1.25 \times (Tr+Tf).$

12. A data recoding equipment according to claim 7, wherein:

said write waveform includes a head pulse and a tail pulse; and if the duration of said head pulse is Tfp, that of said tail pulse is Tep, the rise time of a laser pulse of said data recording equipment is Tr, and the fall time of the same is Tf, at least one of the following is satisfied:

$Tfp \leq 1.25 \times (Tr\alpha Tf);$ $Tep \leq 1.25 \times (Tr+Tf).$

* * * * *